United States Patent
Ren

(10) Patent No.: US 9,390,544 B2
(45) Date of Patent: Jul. 12, 2016

(54) 3D NAVIGATION METHODS USING NONPHOTOREALISTIC (NPR) 3D MAPS

(75) Inventor: Liu Ren, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 1987 days.

(21) Appl. No.: 12/582,142

(22) Filed: Oct. 20, 2009

(65) Prior Publication Data

US 2011/0090221 A1     Apr. 21, 2011

(51) Int. Cl.
| | |
|---|---|
| *G06T 15/00* | (2011.01) |
| *G06T 15/02* | (2011.01) |
| *G01C 21/36* | (2006.01) |
| *G06T 19/00* | (2011.01) |

(52) U.S. Cl.
CPC ............ *G06T 15/02* (2013.01); *G01C 21/3638* (2013.01); *G06T 19/00* (2013.01)

(58) Field of Classification Search
CPC .... G01C 21/3638; G06T 17/05; G06T 19/00; G06T 15/00; G06Q 30/02512
USPC .......... 345/419, 420; 382/113, 305; 701/409, 701/431, 441, 454
See application file for complete search history.

(56) References Cited

U.S. PATENT DOCUMENTS

| | | | | |
|---|---|---|---|---|
| 6,182,010 | B1 * | 1/2001 | Berstis ........................ | 701/441 |
| 7,818,124 | B2 * | 10/2010 | Herbst et al. ................. | 701/439 |
| 7,840,032 | B2 * | 11/2010 | Ofek ............................ | 382/113 |
| 7,925,434 | B2 * | 4/2011 | Kato et al. .................... | 701/454 |
| 8,040,343 | B2 * | 10/2011 | Kikuchi et al. ............... | 345/419 |
| 8,085,990 | B2 * | 12/2011 | Ofek ............................ | 382/113 |
| 8,160,400 | B2 * | 4/2012 | Snavely et al. ............... | 382/305 |
| 8,170,795 | B2 * | 5/2012 | Brulle-Drews et al. ....... | 701/431 |
| 8,224,568 | B2 * | 7/2012 | Nogawa ....................... | 701/409 |
| 2008/0062173 | A1 | 3/2008 | Tashiro | |
| 2009/0113296 | A1 | 4/2009 | Lacy et al. | |

FOREIGN PATENT DOCUMENTS

| | | |
|---|---|---|
| CN | 1609910 A | 4/2005 |
| CN | 101128015 A | 2/2008 |
| CN | 101285689 A | 10/2008 |
| CN | 101470009 A | 7/2009 |

OTHER PUBLICATIONS

Hekmatzada D et al: "Non-Photorealistic Rendering of Complex 3D Models on Mobile Devices," Institute of Computer Science II, Computer Graphics Group; Bonn, Germany; 8th Annual Conference of the International Association of Mathematical Geology, Sep. 20, 2002; XP-002614606; Retrieved from Internet: URL:http://cg.cs.uni-bonn.de/docs/publications/2002/hekmatzada-2002-NPRonPDA.pdf; retrieved on Dec. 15, 2010; 6 pages.

(Continued)

*Primary Examiner* — Phu K Nguyen
(74) *Attorney, Agent, or Firm* — Maginot Moore & Beck LLP

(57) ABSTRACT

A method of displaying a navigation map includes automatically determining a location of a vehicle. Three-dimensional or 2D data associated with buildings surrounding the vehicle is identified. A nonphotorealistic image of 3D objects around the vehicle is rendered based on the data. The nonphotorealistic image is electronically displayed to a user.

6 Claims, 6 Drawing Sheets

(56) References Cited

OTHER PUBLICATIONS

Jahnke, et al.; "Non-Photorealistic Rendering on Mobile Devices and Its Usability Concerns"; International Conference on Developments in Visualization and Virtual Environments in Geographic Information Science; Jan. 8, 2008; XP002614607; Hong Kong; Retrieved from the Internet: URL:http://www.iseis.cuhk.edu.hk/downloads/vge/34.pdf; retrieved on Dec. 15, 2010; 11 pages.

Christos Gatzikis, et al.; "Evaluation of Non-Photorealistic 3D Urban Models for Mobile Device Navigation"; Jul. 19, 2009; Virtual and Mixed Reality, Springer Berlin Heidelberg; Berlin, Heidelberg; pp. 169-178; XP019123127; ISBN: 978-3-642-02770-3; Bournemouth University, Talbot Campus, Poole, UK; City University, London, UK; 10 pages.

Adam Lake, Carl Marshall, Mark Harris and Marc Blackstein, "Stylized Rendering Techniques for Scalable Real-Time 3D Animation," NPAR 2000: Proceedings of the First International Symposium on NonPhotorealistic Animation and Rendering, 2000; Graphics Algorithms and 3D Technologies Group (G3D), Intel Architecture Labs (IAL), University of North Carolina at Chapel Hill. (10 pages).

Hyunjun Lee, Sungtae Kwon, and Seungyong Lee, "Real-Time Pencil Rendering," NPAR 2006: Proceedings of the First International Symposium on Non-Photorealistic Animation and Rendering, 2006; Postech. (9 pages).

Bert Freudenberg, Maic Masuch, and Thomas Strothotte, "Walk-Through Illustrations: Frame-Coherent Pen-and-Ink Style in a Game Engine," Eurographics Assn. 2001; Blackwell Publishers, Oxford UK/ Massachusetts USA 2001. (8 pages).

English Translation of Chinese First Office Action and Search Report corresponding to Chinese Application No. 201080054149.8, dated May 29, 2014 (13 pages).

\* cited by examiner

3D NAVIGATION METHODS USING NONPHOTOREALISTIC (NPR) 3D MAPS

BACKGROUND OF THE INVENTION

1. Field of the Invention

The present invention relates to electronic navigation maps, and, more particularly, to rendering images for electronic navigation maps.

2. Description of the Related Art

Navigation maps are essential resources for visitors to an unfamiliar city because these maps visually highlight landmarks and other points of interest (POIs) such as museums, restaurants, parks and shopping districts. While most in-car and portable navigation devices (PNDs) rely on two-dimensional (2D) navigation maps to visualize these landmarks and POIs in 2D, three-dimensional (3D) in-car navigation systems are emerging. Most of these 3D navigation systems use photorealistic rendering techniques to visualize 3D buildings, landmarks and POIs. In this visualization scheme, precise geometry models and detailed photorealistic building textures are needed. These systems require that the appearances of these rendered 3D buildings, roads or other objects match those of the real buildings, roads or other objects as much as possible. Thus, when a driver sees the real 3D buildings through the windshield, he or she could do a photorealistic match to recognize the 3D landmark. On one hand, a 2D navigation system visualizes almost no details of our 3D world. On the other hand, a navigation system based on photorealistic 3D maps tries to visualize every detail of our 3D world, which could be unnecessary.

What is neither disclosed nor suggested by the prior art is a method for presenting renderings of buildings, landmarks and other 3D objects on a navigation map in a concise way (without unnecessary details) such that the user can easily match the renderings to the real-life views that he observes, and yet only a low level of computational resources is required to produce the renderings.

SUMMARY OF THE INVENTION

The present invention may provide a 3D navigation system that bridges the gap between 2D maps and photorealistic 3D maps by visualizing and highlighting only important details by using non-photorealistic (NPR) or expressive rendering techniques. Typical NPR rendering styles may include cartoon-like rendering, as disclosed in "Stylized rendering techniques for scalable real-time 3D animation", Adam Lake, Carl Marshall, Mark Harris, Marc Blackstein, NPAR '00: Proceedings of the 1st international symposium on Non-photorealistic animation and rendering, 2000, which is incorporated by reference herein in its entirety. Another typical NPR rendering style is pencil sketches, as disclosed in "Real-time pencil rendering", Hyunjun Lee, Sungtae Kwon, Seungyong Lee; NPAR '06: Proceedings of the 1st international symposium on Non-photorealistic animation and rendering, 2006, which is incorporated by reference herein in its entirety. Yet another typical NPR rendering style is pen-and-ink illustrations, as disclosed in "Walk-Through Illustrations: Frame-Coherent Pen-and-Ink Style in a Game Engine", Bert Freudenberg, Maic Masuch, Thomas Strothotte, Eurographics 2001, which is incorporated by reference herein in its entirety. Further typical NPR rendering styles may include oil painting effects, and other painterly styles.

The invention comprises, in one form thereof, a method of displaying a navigation map including automatically determining a location of a vehicle. Three-dimensional data associated with buildings surrounding the vehicle is identified. A nonphotorealistic image is rendered based on the data. The nonphotorealistic image is electronically displayed to a user.

The invention comprises, in another form thereof, an in-vehicle electronic navigation map arrangement including a source of three-dimensional map data. The data is associated with a location of a vehicle. A nonphotorealistic three-dimensional map rendering engine is communicatively coupled to the source of three-dimensional map data. The engine renders a nonphotorealistic three-dimensional image based on the data. A user interface is communicatively coupled to the engine and includes a display screen which electronically displays the nonphotorealistic three-dimensional image.

The invention comprises, in yet another form thereof, a method of displaying a navigation map including automatically determining a location of a vehicle. Three-dimensional data associated with buildings surrounding the vehicle is identified. An input is received from a user. The input is indicative of a nonphotorealistic image style requested by the user. A nonphotorealistic image is rendered based on the data and based on the input. The nonphotorealistic image is electronically displayed to the user.

An advantage of the present invention is that NPR rendering techniques can provide simpler and more expressive visualizations as compared with photorealistic rendering techniques.

Another advantage of the present invention is that, as compared with existing photorealistic 3D navigation systems, NPR 3D maps for 3D in-car navigations improve driver orientation and landmark recognition. A 3D map may improve driver orientation as compared with a 2D map by nature as people live in a 3D world. However, photorealistic 3D rendering may provide too many details, which could introduce unnecessary distractions for navigation purposes. NPR rendering may solve this problem by highlighting the most important features (e.g., shape, depth cues, color variation) of 3D objects for recognition and omitting subtle details.

Yet another advantage of the present invention is that, as compared with existing photorealistic 3D navigation systems, NPR 3D maps for 3D in-car navigations may reduce the need for map updates. The details of the real 3D world may change frequently. A photorealistic 3D map may request frequent map updates to synchronize and be consistent with these changes. These updates could be a burden for both end users and data providers. As NPR provides simpler and expressive visualization of the 3D world, the map updates may be greatly reduced.

A further advantage of the present invention is that, as compared with existing photorealistic 3D navigation systems, NPR 3D maps for 3D in-car navigations may reduce cognitive load by avoiding "photorealistic match". When using a photorealistic 3D map, the user could tend to match all the details of rendered 3D objects with those in the real world as photorealistic 3D maps raise the user's expectation of photorealism. Depending on the degree of photorealism, it may take the user a longer time to match all the details (photorealistic match). On the contrary, the user can avoid "photorealistic match" when a NPR 3D map is used. For example, if a post office is always rendered with a certain style (e.g., specific NPR effects), the user could quickly accept and comprehend the fact that the building is a post office instead of thinking and matching the appearance of a photorealisticly rendered post office with that of the real post office building.

Still another advantage of the present invention is that, as compared with existing photorealistic 3D navigation systems, NPR 3D maps for 3D in-car navigations may be more appealing to the user. NPR 3D maps may be very attractive given the artistic effects provided by different NPR styles. Furthermore, as different users have different preferences, each user could choose and put into effect his favorite rendering styles for the 3D navigation maps.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
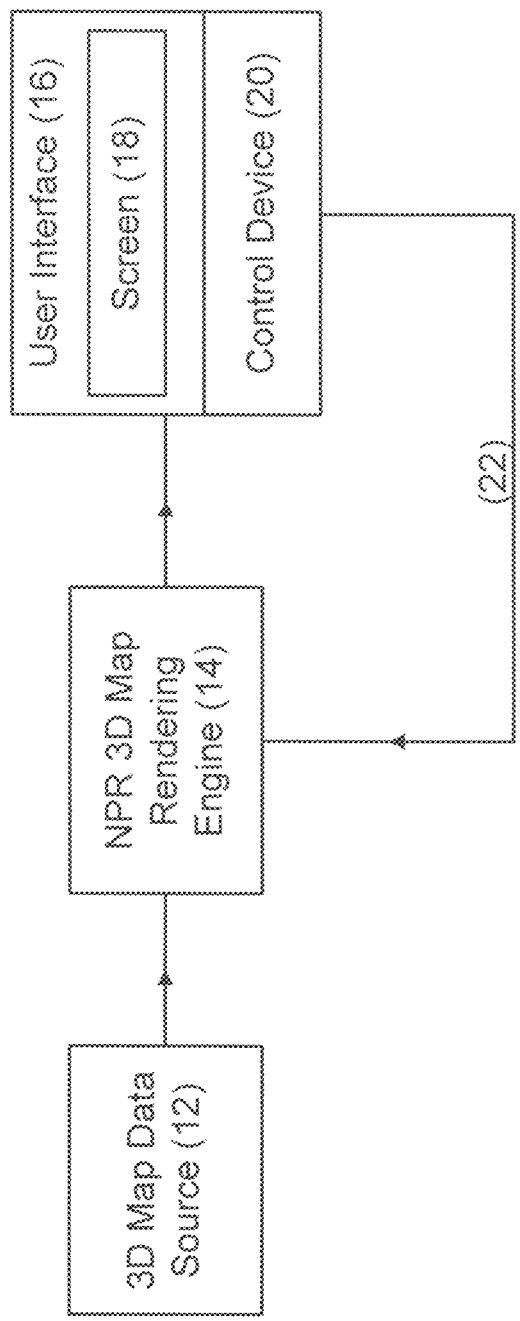
FIG. 1 is a block diagram of one embodiment of a 3D map rendering arrangement of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

The invention may provide a method of 3D navigation using NPR 3D maps, including stylized visualization for the 3D objects in a navigation map. The 3D objects displayed on a 3D navigation map may include buildings, landmarks, POIs, hazard spots, and roads. The NPR 3D maps may be created based on 3D object data that may be generated in different ways. The 3D data may be offered by a data provider in a format suitable for only photorealistic rendering (for example, polygon meshes with photorealistic textures). In this case, such data may be enhanced for NPR rendering. The 3D data may also be generated by reconstruction of 2D data for stylized NPR rendering. For example, 3D building data may be generated from the 2D footprint of the building without or with additional information (such as the type of the building, the height of the building, etc). In this process, specific rules may be applied based on the type of the 3D building so that the style or appearance of buildings of the same type may be consistent. For example, post office buildings with different 2D footprints may still have a similar stylized appearance.

Referring now to the drawings, and particularly to FIG. 1, there is shown one embodiment of a 3D map rendering arrangement 10 of the present invention that may be associated with a vehicle, such as an automobile, boat, airplane, etc. That is, arrangement 10 may be installed in-vehicle.

Arrangement 10 may include a source 12 of 3D map data, an NPR 3D map rendering engine 14, and a user interface 16. 3D map data source 12 may be in the form of a compact disc (CD) or other memory device. Alternatively, 3D map data may be wirelessly transmitted by a central transmitter (not shown) to a large number of vehicles that each has a respective 3D map rendering arrangement 10. Such wireless transmissions may be received by engine 14.

3D map data source 12 may also include a global positioning system (GPS) module (not shown) for determining the global location coordinates of the vehicle in real time. Based on the current location of the vehicle, corresponding 3D map data that is of interest to people within the vehicle is identified and provided to engine 14.

NPR 3D map rendering engine 14 may include a standard electronic processor that converts the 3D map data from source 12 into nonphotorealistic image data. The NPR image data may be in various styles, such as cartoon-like rendering, pencil sketches, pen-and-ink illustrations, oil painting effects, and other painterly styles. The NPR renderings may depict surfaces of objects and distinctive or well-known features of the objects.

User interface 16 may be disposed on a dashboard of a vehicle and may include a display screen 18 and a control device 20. Display screen 18 may include a processor and memory for controlling the information or content that is displayed on the screen or monitor. Generally, display screen 18 may present or depict NPR 3D image data received from engine 14.

Control device 20 may be in the form of a dial, knob, set of pushbuttons, joystick, microphone, or any combination of the above. A user may use control device 20 to provide feedback 22 to engine 14. Feedback 22 may instruct engine 14 to produce another set of image data (e.g., image data depicting another scene, object or set of objects). Alternatively, feedback 22 may instruct engine 14 to change the viewing angle at which a current set of image data is being viewed. The viewing angle may vary from an overhead bird's-eye view of the surroundings to an angle looking up at buildings, or at a landscape, from a ground level or street level.

In another embodiment, instead of source 12 providing 3D map data, source 12 provides 2D footprints of one or more buildings plus some additional information such as type and height of the building(s). In this case, engine 14 may first generate the 3D structure of the building(s) and then apply NPR rendering for such building(s).

Figure 2:
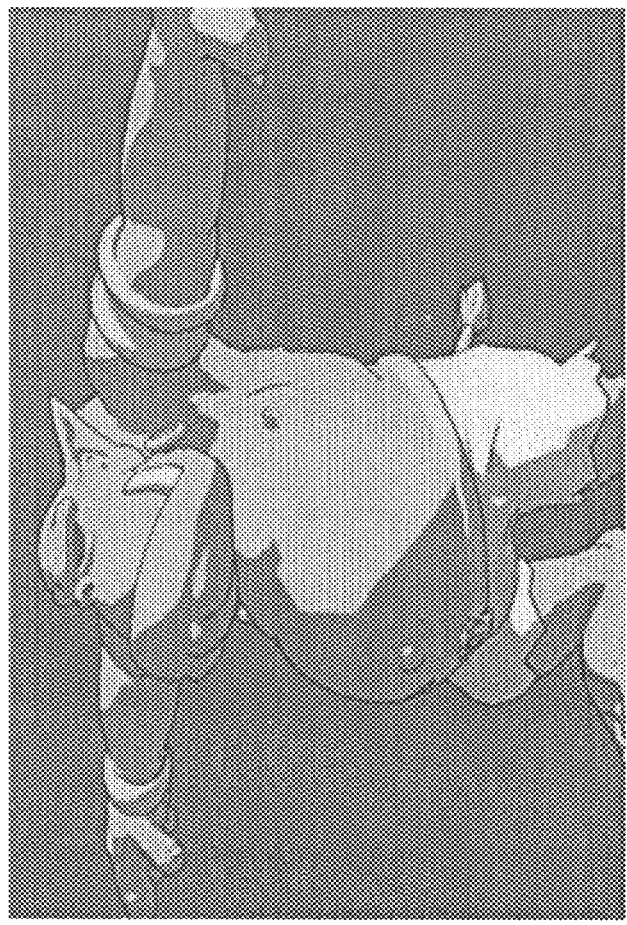
FIG. 2 is an example cartoon style rendering technique for scalable real-time 3D animation that may be suitable for use in at least some embodiments of a 3D map rendering method of the present invention.
Figure 3:
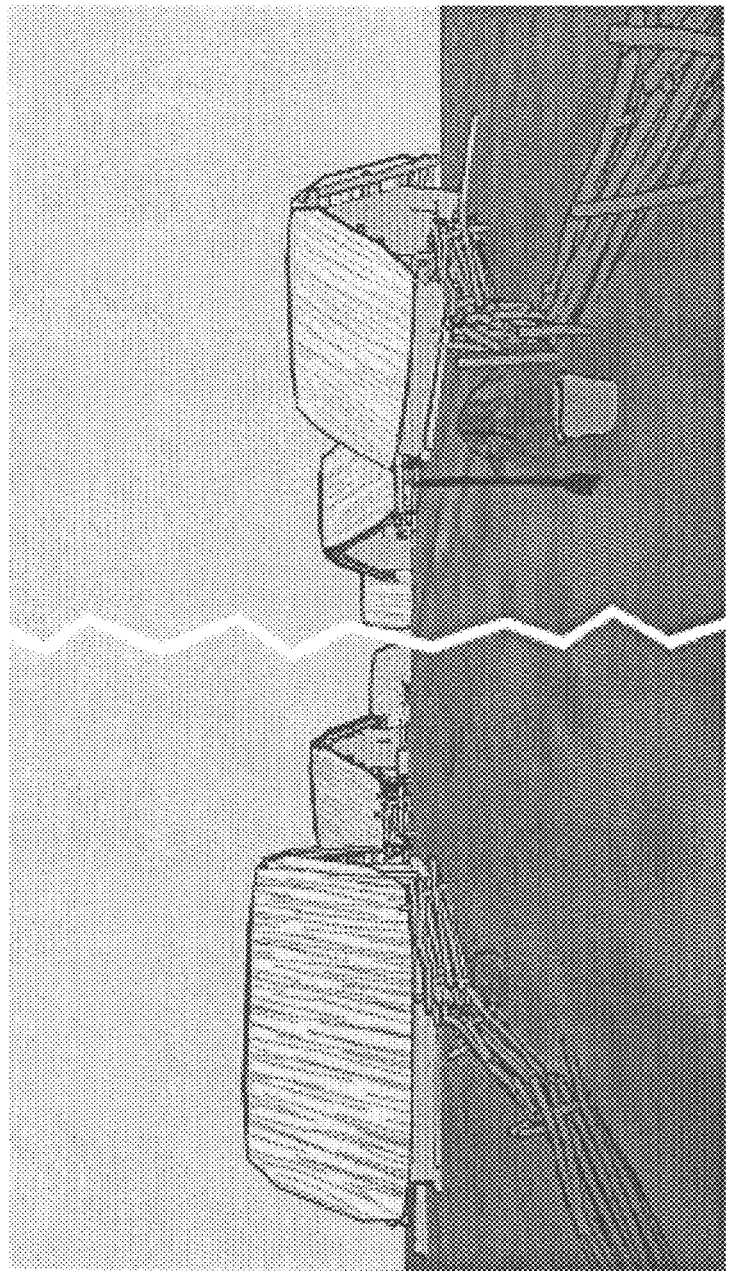
FIG. 3 is an example pen-and-ink style rendering that may be suitable for use in at least some embodiments of a 3D map rendering method of the present invention.
Figure 4:
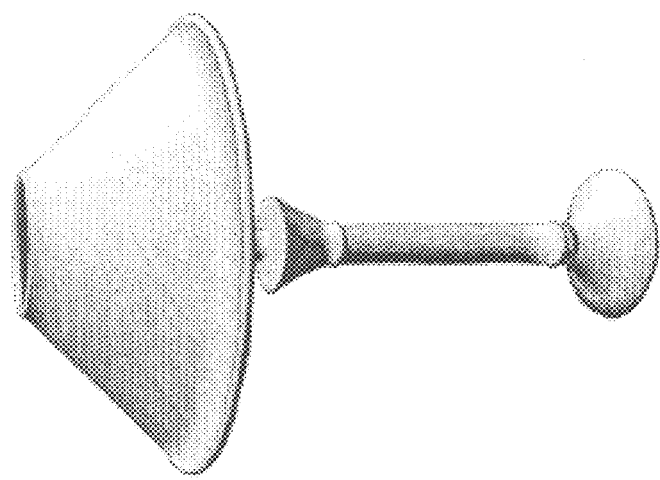
FIG. 4 is an example pencil rendering that may be suitable for use in at least some embodiments of a 3D map rendering method of the present invention.
Figure 5:
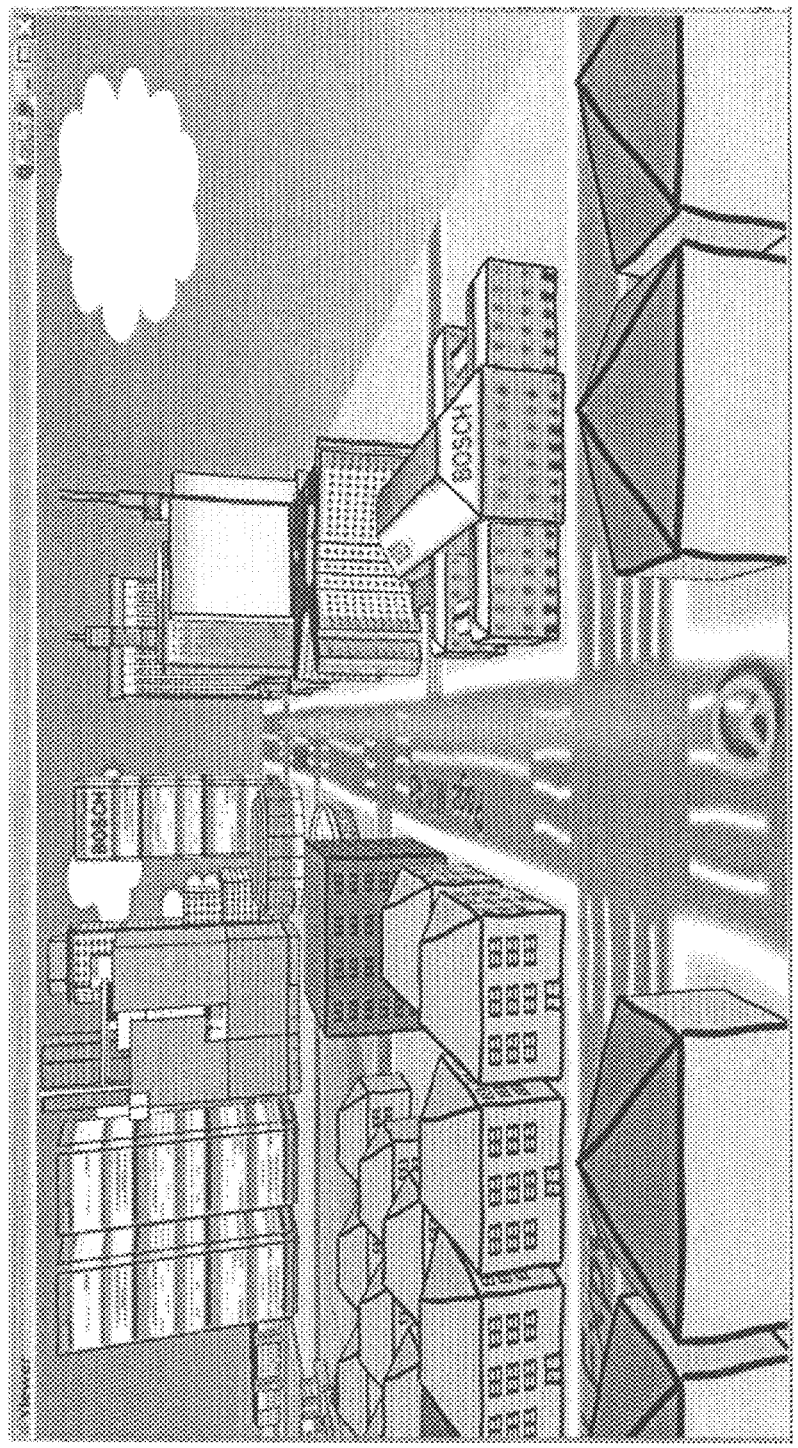
FIG. 5 is an example cartoon style rendering that may be suitable for use in at least some embodiments of a 3D map rendering method of the present invention.

FIGS. 2-5 illustrate various NPR styles that have not been applied to the navigation domain in the prior art. Each of these styles in FIGS. 2-5 may be suitable for use in conjunction with NPR 3D map rending methods of the present invention. More particularly, FIG. 2 illustrates a cartoon-like stylized rendering technique for scalable real-time 3D animation; FIG. 3 illustrates a pen-and-ink rendering; FIG. 4 illustrates a real-time pencil rendering; and FIG. 5 illustrates a cartoon-style NPR 3D map that is an example of an NPR 3D map that may be rendered by the present invention.

In FIG. 5, several of the buildings in the forefront are depicted in an NPR style based on the buildings' footprints. The geometry data may be generated by rendering engine 14. Several other buildings are depicted in FIG. 5 in an NPR style of the invention, such as the buildings having "BOSCH" thereon. For these "BOSCH" buildings, both the geometry and the original textures may be provided by data providers, and such geometry and original textures may be conventionally used only for photorealistic rendering. According to the present invention, however, NPR engine 14 may perform some processing to provide the illustration of the buildings with an NPR appearance.

In one embodiment, the user may be able to adjust the angle of view depicted in FIG. 5 to any viewing angle or any location at ground level or above. For example, the user may choose among a nearly infinite number of views along a 360 degree arc around any or all of the buildings. Further, the user may choose any downward viewing angle along a vertical plane.

The invention provides several novel features, including a 3D navigation system that employs nonphotorealistic rendering. Another novel feature is the ability to enable or enhance personalization of 3D navigation. For example, a user may be able to select the NPR style (e.g., cartoon, pen-and-ink, pencil, etc.) in which buildings or natural landmarks are depicted. The user may also be able to select which buildings or natural landmarks in the image are to be depicted in an NPR rendering. In one embodiment, the user may be able to touch the building or natural landmark on a touch screen display to cause the system to render an NPR image of the building or natural landmark. Other buildings or natural landmarks within the image of the display may be depicted in a generic or nonrealistic style. However, in another embodiment of the invention, all the buildings, roads and natural features are rendered with a same specific style, which may be chosen by the user.

Yet another novel feature of the invention is the ability to reuse 3D data of photorealistic 3D navigation for NPR 3D navigation. That is, photorealistic 3D navigation data may be enhanced or modified in order to be used in rendering NPR 3D navigation images.

Still another novel feature of the invention is the creation of 3D data for stylized visualization in NPR 3D navigation. The stylized visualization may include the depiction of only selected, recognizable aspects of the buildings so as to not clutter the image and so as to simplify the user's recognition task. For example, in the embodiment of FIG. 5, only large surfaces, windows, and large signage on the NPR-depicted buildings are included in the image.

As described above, the invention provides several aspects neither disclosed nor suggested by the prior art, including using NPR rendering for 3D navigation; employing any of multiple NPR styles for a 3D navigation system, thereby enabling a personalized 3D navigation system; reusing existing photorealistic 3D object data for NPR 3D navigation; and creating 3D data for stylized visualization in NPR 3D navigation.

Figure 6:
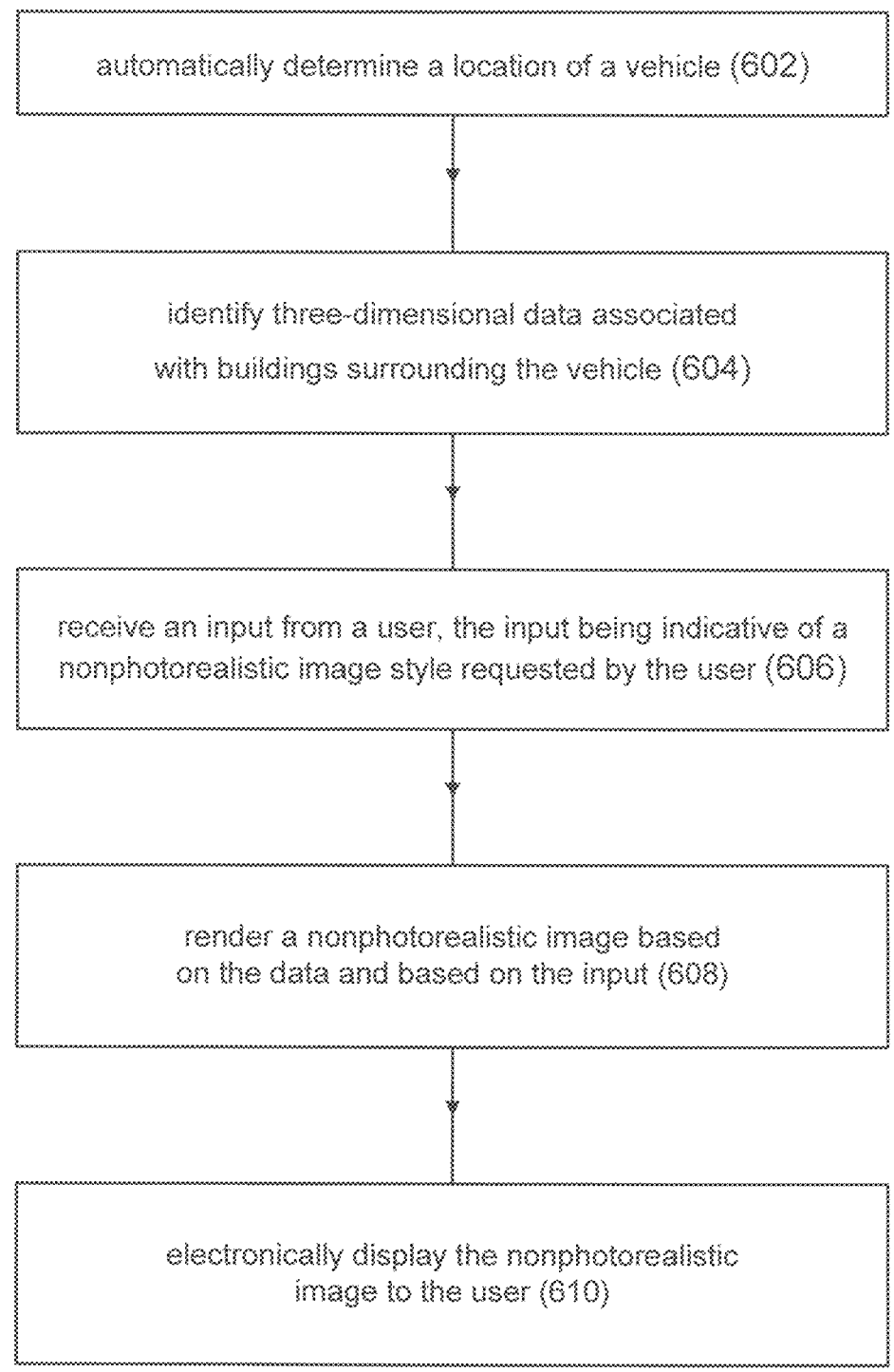
FIG. 6 is a flow chart illustrating a method of the present invention for displaying a navigation map.

An embodiment of a method 600 of the present invention for displaying a navigation map is illustrated in FIG. 6. In a first step 602, a location of a vehicle is automatically determined. For example, the arrangement of FIG. 1 may include a GPS or other device that automatically and continuously updates a current location (which may be expressed in global coordinates) of a vehicle associated with the arrangement.

In a next step 604, three-dimensional data associated with buildings surrounding the vehicle is identified. For example, based on the vehicle location determined in step 602, map data associated with the vicinity of the vehicle may be retrieved from a memory device, such as a CD. Alternatively, the map data associated with the vicinity of the vehicle may be wirelessly received from a central repository of map data. Regardless of how it is received, the map data may include 3D data describing the shape, dimensions, colors and windows of the buildings and natural landmarks within the vicinity of the vehicle. In another embodiment, the map data contains the 2D footprint data of a building. In this case, rendering engine 14 may generate a 3D building based on the 2D footprint of the data.

Next, in step 606, an input is received from a user. The input is indicative of a nonphotorealistic image style requested by the user. For example, the user may use a control device 20 on user interface 16 to select one of the NPR rendering styles depicted in FIGS. 2-5. In one embodiment, the user may choose between cartoon style, pen-and-ink style, and pencil style. It is further possible for the user to select different styles for different buildings and/or landmarks. For example, by use of feedback 22, the user may select cartoon style for natural landmarks, such as trees or mountains, and pencil style for buildings or other man-made structures.

In step 608, a nonphotorealistic image is rendered based on the data and based on the input. That is, rendering engine 14 may create an NPR image based on the 3D data received from source 12, and the NPR image may be created in the style requested by the user.

In a final step 610, the nonphotorealistic image is electronically displayed to the user. In one embodiment, the NPR image rendered by engine 14 is displayed on a screen 18 of a user interface 14.

While this invention has been described as having an exemplary design, the present invention may be further modified within the spirit and scope of this disclosure. This application is therefore intended to cover any variations, uses, or adaptations of the invention using its general principles.

What is claimed is:

1. A method of displaying a navigation map, comprising the steps of:
    automatically determining a location of a vehicle;
    identifying three-dimensional data associated with buildings surrounding the vehicle;
    receiving an input from a user, the input being indicative of a nonphotorealistic image style requested by the user;
    rendering a nonphotorealistic image based on the data and based on the input; and
    electronically displaying the nonphotorealistic image to the user.

2. The method of claim 1 wherein the nonphotorealistic image style comprises one of a cartoon style, a pen-and-ink style, and a pencil style.

3. The method of claim 1 wherein the identifying step includes finding three-dimensional data associated with the location of the vehicle.

4. The method of claim 3 wherein the identifying step includes retrieving the data from a compact disc disposed within the vehicle.

5. The method of claim 3 wherein the identifying step includes wirelessly receiving the data from a central repository of three-dimensional data.

6. The method of claim 1 comprising the further step of modifying a viewing angle of the nonphotorealistic image based on feedback from the user, the data describing shapes, dimensions, colors and windows of the buildings.

* * * * *